United States Patent
Kawasaki et al.

(10) Patent No.: US 7,054,625 B2
(45) Date of Patent: May 30, 2006

(54) WIRELESS COMMUNICATION SYSTEM, WIRELESS MICROPHONE, AND WIRELESS MICROPHONE CONTROL METHOD

(75) Inventors: Yuji Kawasaki, Sagamihara (JP); Akira Suzuki, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 439 days.

(21) Appl. No.: 10/307,173

(22) Filed: Nov. 29, 2002

(65) Prior Publication Data
US 2004/0106384 A1    Jun. 3, 2004

(51) Int. Cl.
*H04M 3/00*    (2006.01)
(52) U.S. Cl. ......................................... 455/420; 455/92
(58) Field of Classification Search ........ 455/418–420, 455/66.1, 88, 92, 550.1, 151.2, 352–355, 455/41.1, 41.2; 381/104–105, 122; 340/825.22
See application file for complete search history.

(56) References Cited

U.S. PATENT DOCUMENTS

| | | | |
|---|---|---|---|
| 5,319,717 A | | 6/1994 | Holesha |
| 6,175,860 B1 * | | 1/2001 | Gaucher ..................... 709/208 |
| 6,906,635 B1 * | | 6/2005 | Moutaux et al. ........ 340/825.22 |
| 2002/0042282 A1 * | | 4/2002 | Haupt ......................... 455/509 |
| 2004/0106398 A1 * | | 6/2004 | Statham et al. ............. 455/420 |

FOREIGN PATENT DOCUMENTS

| | | | |
|---|---|---|---|
| EP | 0 455 203 A | | 11/1991 |
| JP | 405183788 A | * | 7/1993 |
| JP | 2002359894 A | * | 12/2002 |
| WO | 00 79832 | | 12/2000 |
| WO | 00/79835 A | | 12/2000 |

\* cited by examiner

Primary Examiner—Nguyen T. Vo
(74) Attorney, Agent, or Firm—Pearne & Gordon LLP

(57) ABSTRACT

Herein disclosed is a wireless microphone for receiving a sound signal and transmitting a radio signal and operable in combination with an acoustic operation unit to output a control signal, including a modulating unit for modulating the radio signal with the sound signal to produce a modulated radio signal, the modulating unit being operative under a plurality of operation conditions and having a plurality of signal channels in association with the operation conditions allowing the modulated radio signals to pass therethrough; a detecting unit for detecting the control signal outputted by the acoustic operation unit, the control signal being indicative of the operation conditions of the modulating unit; and adjusting unit for adjusting the operation conditions of the modulating unit in response to the control signal from the acoustic operation unit.

23 Claims, 11 Drawing Sheets

WIRELESS COMMUNICATION SYSTEM, WIRELESS MICROPHONE, AND WIRELESS MICROPHONE CONTROL METHOD

BACKGROUND OF THE INVENTION

1. Technical Field of the Invention

The present invention relates to a wireless communication system for transmitting and receiving a radio signal carrying a voice signal indicative of a speaker's voice, and more particularly to a wireless communication system comprising at least one wireless microphone for transmitting a radio signal carrying a voice signal and a wireless receiving unit for receiving the radio signal carrying the voice signal transmitted by the wireless microphone in a local communication area to ensure reliable communication based on a channel, a gain, and other operation conditions inputted into the wireless microphone.

2. Description of the Related Art

Up until now, there have been proposed a wide variety of wireless communication systems of this type one typical example of which is shown in FIG 12. The conventional wireless communication system is shown in FIG. 12 as comprising at least one wireless microphone for receiving a speaker's voice while transmitting a radio signal carrying a voice signal indicative of the speaker's voice and a wireless receiving unit for receiving the radio signal carrying the voice signal transmitted by the wireless microphone.

The wireless microphone includes sound signal receiving means 11 for receiving a speaker's voice while converting the speaker's voice into a voice signal, a sound signal amplifier 12 for amplifying the voice signal received by the sound signal receiving means 11, a channel selecting switch 27 having signal channels to select one of the signal channels, storing means 19 for storing information on frequencies of the radio signals in association with the signal channels, deciding means 18 for deciding the frequency of the radio signal in response to the signal channels selected by the channel selecting switch 27 with reference to the information stored by the storing means 19, modulating means 13 for modulating the radio signal to produce the radio signal carrying the voice signal amplified by the sound signal amplifier 12, controlling means 16 for allowing the modulating means 13 to generate the radio signal in association with the signal channel selected by the channel selecting switch 27, a radio signal amplifier 14 for amplifying the radio signal carrying the voice signal produced by the modulating means 13, and transmitting means 15 for transmitting the radio signal carrying the voice signal amplified by the radio signal amplifier 14.

The channel selecting switch 27 has a plurality of switch elements to be selectively operated for transmitting respective radio signals to the transmitting means. The switch elements are arranged in the wireless microphone which has a cover member to cover switch elements. The structure of the microphone and the switch elements thus constructed requires an operator to open and close the cover member before the switch elements are selectively operated to change the signal channels. The operator finds it laborious to perform such an opening and closing operation before selecting the desirable signal channels. On the other hand, there is no wireless communication system comprising a receiving unit which can select the signal channels in cooperation with the wireless microphone. If the conventional wireless communication systems are installed in the vicinity to each other, as shown in FIG. 11, the radio signal outputted from one of the wireless communication system tends to interfere with the radio signal from the other of the wireless communication systems and therefore leads to deteriorate the productivity of the speaker's voice when the switch elements are mistaken to be operated by the operator.

The previously mentioned conventional wireless communication system thus constructed as previously mentioned encounters such problems that the wireless microphone makes it laborious to open and close the cover member before the switch elements are selectively operated to change the signal channels, and that the wireless receiving unit of one of the conventional wireless communication system tends to receive the radio signals transmitted by the wireless microphones of the other of the conventional wireless communication systems and therefore leads to deteriorate the productivity of the speakers voice.

SUMMARY OF THE INVENTION

It is, therefore, an object of the present invention to provide a wireless communication system, a wireless microphone, and a wireless microphone control method makes it easy to operate the signal channels, the gains, and other operation conditions without opening and closing the cover member before the switch elements are selectively operated to change the signal channels to attain an excellent reproductivity.

It is an another object of the present invention to provide a wireless communication system which can attain an excellent reproductivity without interfering with each other in the local communication area in which the wireless communication systems are installed in the vicinity to each other.

According to the first aspect of the present invention, theme is provided a wireless microphone for receiving a sound signal and transmitting a radio signal and operable in combination with an acoustic operation unit to output a plurality of control signals and a sound signal indicative of a sound wave, comprising: sound signal receiving means for receiving a sound signal indicative of a sound wave together with the control signals and the sound signal outputted by the acoustic operation unit; modulating means for modulating the radio signal with the sound signal to produce a modulated radio signal, the modulating means being operative under a plurality of operation conditions and having a plurality of signal channels in association with the operation conditions allowing the modulated radio signals to pass therethrough; detecting means for detecting the control signals selectively from among the control signals and the sound signals received by the sound signal receiving means, the control signals being respectively indicative of the operation conditions of the modulating means; and adjusting means for adjusting the operation conditions of the modulating means in response to the control signals detected by the detecting means.

According to the second aspect of the present invention, there is provided a wireless microphone control method, comprising: a preparing step of preparing a wireless microphone for receiving a sound signal and transmitting a radio signal and operable in combination with an acoustic operation unit to output a plurality of control signals and a sound signal indicative of a sound wave, comprising: sound signal receiving means for receiving a sound signal indicative of a sound wave together with the control signals and the sound signal outputted by the acoustic operation unit; modulating means for modulating the radio signal with the sound signal to produce a modulated radio signal, the modulating means being operative under a plurality of operation conditions and having a plurality of signal channels in association with the operation conditions allowing the modulated radio signals to pass therethrough; detecting means for detecting the control signals selectively from among the control signals and the sound signals received by the sound signal receiving means, the control signals being respectively indicative of the operation conditions of the modulating means; and adjusting means for adjusting the operation conditions of the modulating means in response to the control signals detected by the detecting means, a sound signal receiving step of receiving a sound signal indicative of a sound wave together with the control signals and the sound signal outputted by the acoustic operation unit; a detecting step of detecting the control signals selectively from among the control signals and the sound signals received in the sound signal receiving step; and adjusting step of adjusting the operation conditions in association with the control signals detected in the detecting step.

According to the third aspect of the present invention, there is provided a wireless communication system for receiving a sound signal and transmitting a radio signal, comprising: an acoustic operation unit for outputting a plurality of control signals and a sound signal indicative of a sound wave; and a wireless microphone for receiving the control signals from the acoustic operation unit, and the wireless microphone including: sound signal receiving means for receiving a sound signal indicative of a sound wave together with the control signals and the sound signal outputted by the acoustic operation unit; modulating means for modulating the radio signal with the sound signal to produce a modulated radio signal, the modulating means being operative under a plurality of operation conditions and having a plurality of signal channels in association with the operation conditions allowing the modulated radio signals to pass therethrough; detecting means for detecting the control signals selectively from among the control signals and the sound signals received by the sound signal receiving means, the control signals being respectively indicative of the operation conditions of the modulating means; and adjusting means for adjusting the operation conditions of the modulating means in response to the control signals detected by the detecting means.

The wireless microphone may feather include a sound signal amplifier for amplifying the sound signal received by the sound signal receiving means to produce an amplified sound signal, the sound signal amplifier being operative under a plurality of operation conditions and having a plurality of amplification gains in association with the operation conditions to affect the sound signal; and in which the detecting means is operative to detect the control signals respectively indicative of the operation conditions of the sound signal amplifier, and the adjusting means is operative to adjust the operation conditions of the sound signal amplifier in response to the control signals detected by the detecting means.

The wireless microphone may further include sound signal muting means for muting the sound signal, the sound signal muting means being operative under a plurality of operation conditions and having two different states consisting of first and second states in association with the operation conditions, the first state in which the sound signal muting means is operative not to mute the sound signal received by the sound signal receiving means, and the second state in which the sound signal muting means is operative to mute the sound signals received by the sound signal receiving means; the detecting means is operative to detect the control signals respectively indicative of the operation conditions of the sound signal muting means; and the adjusting means is operative to adjust the operation conditions of the sound signal muting means in response to the control signals detected by the detecting means.

The wireless microphone may further include transmitting means for transmitting the amplified radio signal, the transmitting means being operative under a plurality of operation conditions and having two different states consisting of first and second states in association with the operation conditions, the first state in which the transmitting means is operative to transmit the amplified radio signal, and the second state in which the transmitting means is operative not to transmit the amplified radio signal; and in which the detecting means is operative to detect the control signals respectively indicative of the operation conditions of the transmitting means, and the adjusting means is operative to adjust the operation conditions of the transmitting means in response to the control signals detected by the detecting means.

The wireless microphone may further include a radio signal amplifier for amplifying the modulated radio signal to produce an amplified radio signal, the radio signal amplifier being operative under a plurality of operation conditions and having a plurality of gains in association with the operation conditions to affect the modulated radio signal; and in which the detecting means is operative to detect the control signals respectively indicative of the operation conditions of the radio signal amplifier, and the adjusting means is operative to adjust the operation conditions of the radio signal amplifier in response to the control signals detected by the detecting means.

The wireless microphone may further include power supply means for supplying electricity, the power supply means being operative under a plurality of operation conditions and having two different states consisting of first and second states in association with the operation conditions, the first state in which the power supply means is operative to supply the electricity, and the second state in which the power supply means is operative to save the electricity; the detecting means is operative to detect the control signals respectively indicative of the operation conditions of the power supply means; and the adjusting means is operative to adjust the operation conditions of the power supply means in response to the control signals detected by the detecting means.

The wireless microphone may further include sound signal amplifier for amplifying the sound signal received by the sound signal receiving means to produce an amplified sound signal, the sound signal amplifier being operative under a plurality of operation conditions and having a plurality of acoustic characteristics in association with the operation conditions to affect the sound signal based on the acoustic characteristics; and in which the detecting means is operative to detect the control signals respectively indicative of the operation conditions of the sound signal amplifier, and the adjusting means is operative to adjust the operation conditions of the sound signal amplifier in response to the control signals detected by the detecting means.

The wireless microphone may further include measuring means for measuring an elapsed time, for judging whether or not the elapsed time exceeds a predetermined waiting time, for producing an alarm signal, and the measuring means being operative to produce the alarm signal when judging as the elapsed time exceeds the predetermined waiting time; sound signal amplifier for amplifying the alarm signal produced by the measuring means to produce an amplified alarm signal, the sound signal amplifier being operative under a plurality of operation conditions and having two different states consisting of first and second states in association with the operation conditions, the first state in which the sound signal amplifier is operative to amplify the alarm signal to produce the amplified alarm signal, and the second state in which the sound signal amplifier is operative not to amplify the alarm signal; and in which the detecting means is operative to detect the control signals respectively indicative of the operation conditions of the sound signal amplifier, and the adjusting means is operative to adjust the operation conditions of the sound signal amplifier in response to the control signals detected by the detecting means.

In the wireless communication system, the acoustic operation unit may be operative to output dial tone multi-frequency signals respectively indicative of the control signals.

In the wireless communication system, the acoustic operation unit may be operative to output musical sounds respectively indicative of the control signals.

BRIEF DESCRIPTION OF THE DRAWINGS

The objects, features and advantages of the present invention will become apparent as the description proceeds when taken in conjunction with the accompanying drawings, in which.

DESCRIPTION OF TIE PREFERRED EMBODIMENTS

The embodiments of the wireless communication system, the wireless microphone, and the wireless microphone controlling method according to the present invention will be described in detail hereinafter.

The first embodiment of the wireless communication system according to the present invention will now be described with reference to FIG. 1.

Figure 1:
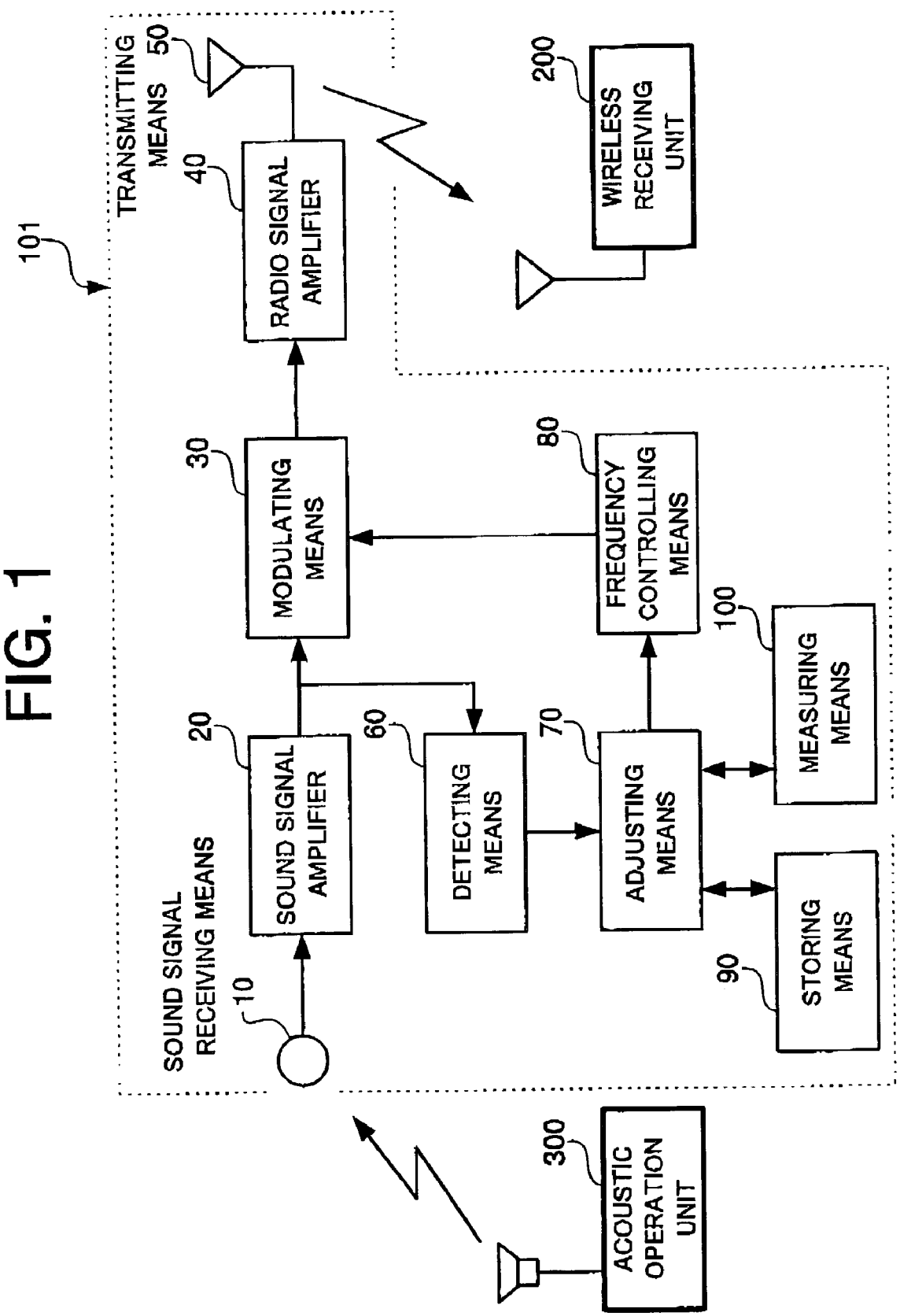
FIG. 1 is a block diagram of the first embodiment of the wireless communication system according to the present invention.

The wireless communication system is shown in FIG. 1 as comprising a wireless microphone 101 having adjustable operation conditions to transmit radio signals, a wireless receiving unit 200 for receiving the radio signals from the wireless microphone 101, and an acoustic operation unit 300 for outputting control signals respectively indicative of the operation conditions of the wireless microphone 101.

Figure 12:
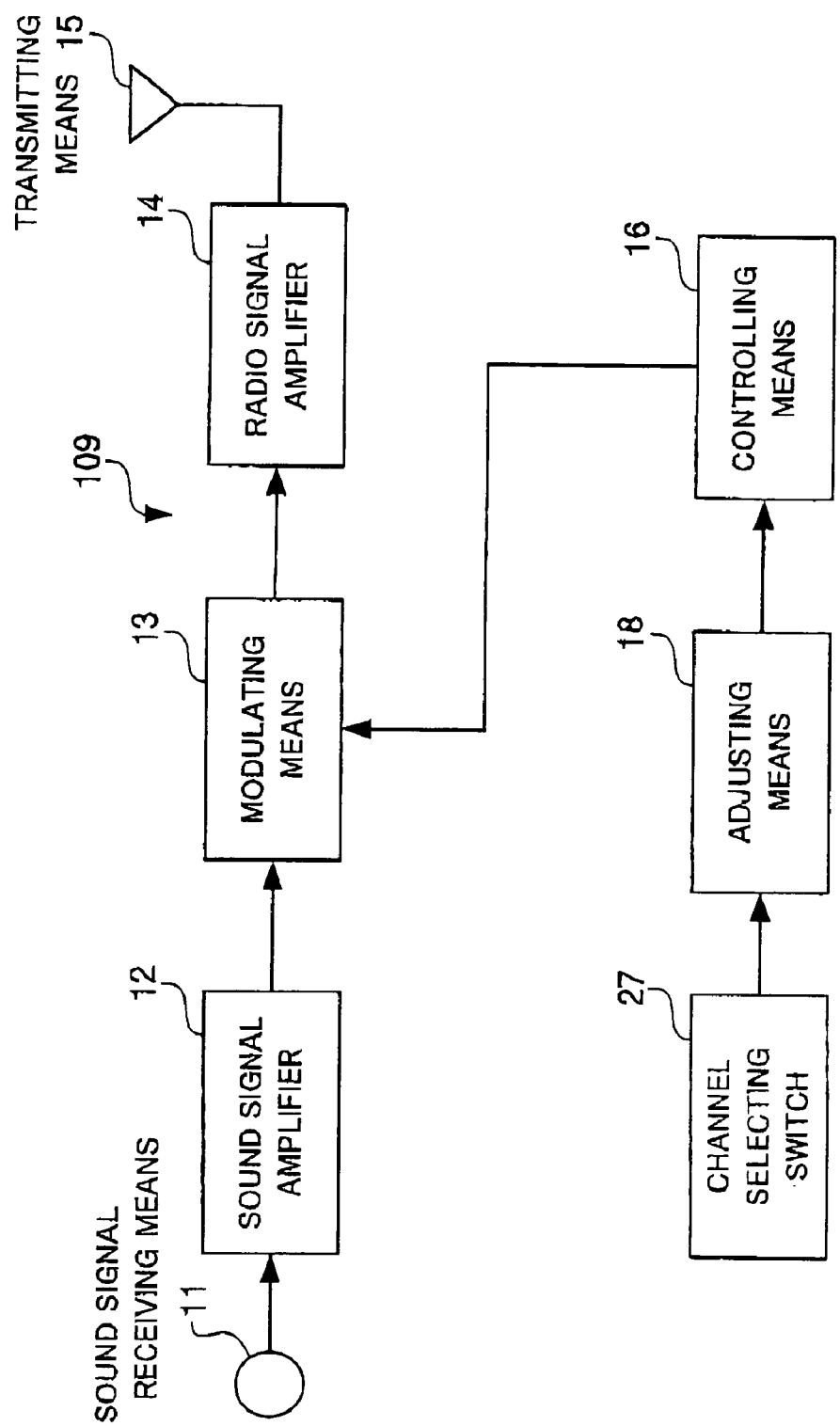
FIG. 12 is a block diagram of the conventional wireless microphone.

The wireless microphone 101 according to the present invention is shown in FIG. 1 as partly similar in construction to the conventional wireless microphone shown in FIG. 12 and thus includes sound signal receiving means 10 for receiving the control signals from the acoustic operation unit 300 and sound signals indicative of sound waves generated in the vicinity of wireless microphone 101, a sound signal amplifier 20 for amplifying the control signals and the sound signals received by the sound signal receiving means 10 to produce a amplified sound signal, detecting means 60 for detecting the control signals from the amplified sound signal amplified by the sound signal amplifier 20, storing means 90 for storing the operation conditions in association with the control signals, adjusting means 70 for adjusting the operation conditions in response to the control signals detected by the detecting means 60 with reference to the operation conditions stored by the storing means 90, modulating means 30 for modulating the radio signal with the sound signal to produce a modulated radio signal, the modulating means 30 being operative under a plurality of operation conditions and having a plurality of signal channels in association with the operation conditions allowing the modulated radio signals to pass therethrough, a radio signal amplifier 40 for amplifying the modulated radio signal to produce an amplified radio signal, transmitting means 50 for transmitting the amplified radio signal, frequency controlling means 80 for allowing the modulating means 30 to produce the modulated radio signal in response to the operation conditions adjusted by the adjusting means 70, and measuring means 100 for measuring elapse time and judging whether or not the elapse time exceeds predetermined waiting time.

The adjusting means 70 is operative to adjust the operation conditions in response to the control signals detected by the detecting means 60 with reference to the operation conditions stored by the storing means 90 when the measuring means 100 is operative to judge as the elapse time does not exceed predetermined waiting time. The adjusting means 70 is, on the other hand, non-operative to adjust the operation conditions in response to the control signals detected by the detecting means 60 with reference to the operation conditions stored by the storing means 90 when the measuring means 100 is operative to judge as the elapse time exceeds predetermined waiting time.

The wireless communication system can prevent the operation conditions of the wireless microphone 101 from being adjusted by the adjusting means 70 in response to foreign sounds generated in the vicinity of the wireless microphone 101 while the measuring means 100 is operative to judge as the elapse time exceeds predetermined waiting time.

Here, the modulating means 30, the detecting means 60, the adjusting means 70, the control means 80, and the memory 90 forming part of the wireless communication system according to the first embodiment of the present invention is respectively constituted by Voltage Control Oscillator circuit, Dial Tone Multi-Frequency sound detecting circuit (referred to simply as "DTMF sound detecting circuit"), Central Processing Unit, Phase Locked Loop circuit, and nonvolatile memory.

The wireless receiving unit 200 includes receiving mean for receiving the radio signal carrying the sound signals from the wireless microphone 101, demodulating means for reproducing the sound signals from the radio signal carrying the sound signals by the receiving means, and a loudspeaker for loudening sounds indicative of the sound signals reproduced by the demodulating means.

In the above foregoing description, the control signals is outputted by the acoustic operation unit 300, however, the acoustic operation unit 300 may be operative to output dial tone multi-frequency (referred to simply as "DTMF") sounds respectively indicative of the operation conditions of the wireless microphone 101.

Figure 9:
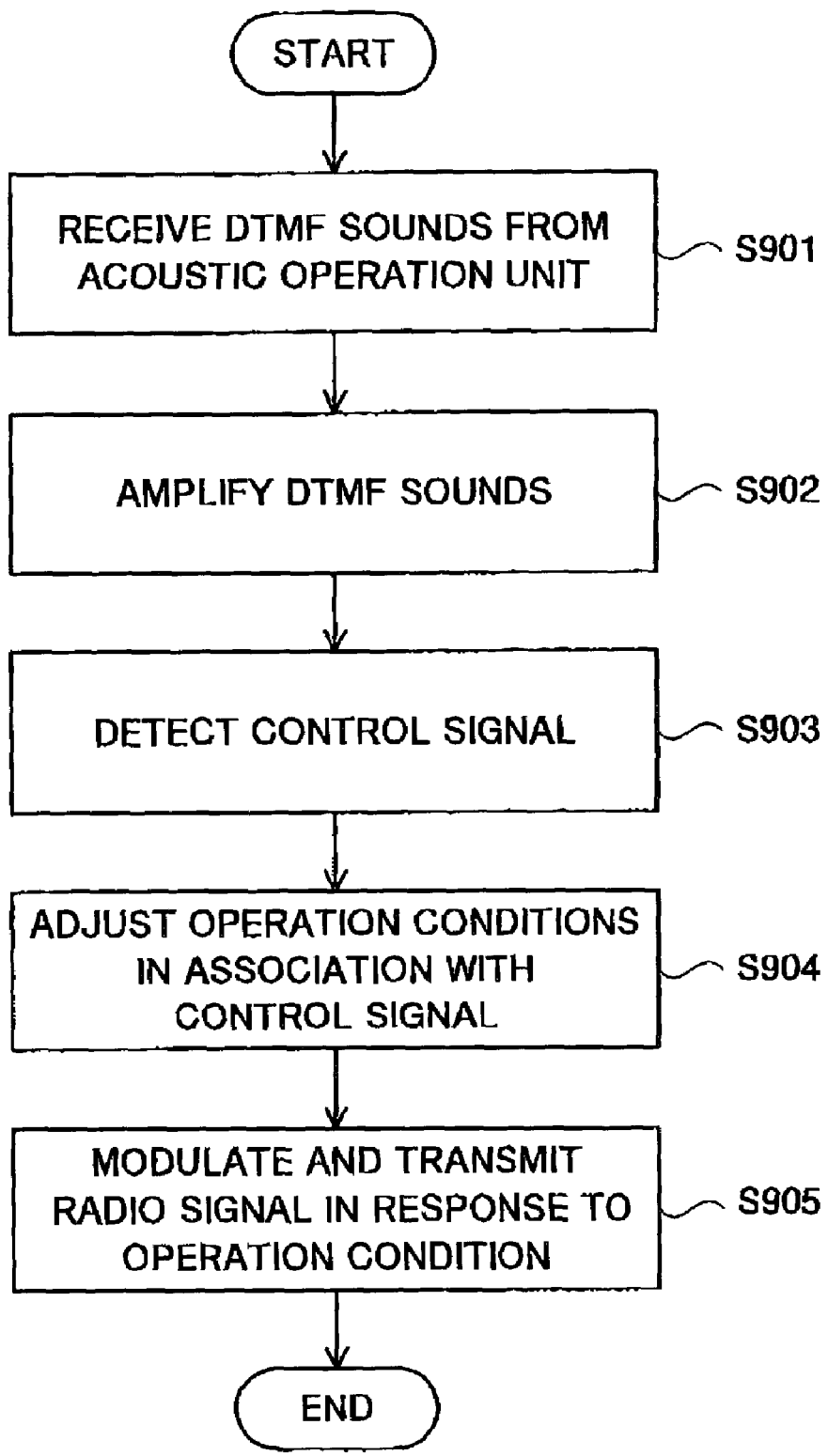
FIG. 9 is a flowchart of the process in the first embodiment of the wireless communication system according to the present invention.

The following description will now be directed to the process of the first embodiment of the wireless communication system according to the present invention with reference to FIG. 9.

The DTMF sounds in association with the operation condition of the transmitting means 50 is firstly generated and outputted by the acoustic operation unit 300. The DTMF sounds together with sounds generated in the vicinity of the wireless microphone 101 is then received by the sound signal receiving means 10 in the step S901. The DTMF sounds and the sounds received by the sound signal receiving means 10 is then amplified by the sound signal amplifier 20 in the step S902. The DTMF sounds is detected by the detecting means 60 from among the DTMF sounds and the sounds amplified by the sound signal amplifier 20 in the step S903. The operation condition of the transmitting means 50 is then adjusted by the adjusting means 70 in response to the DTMF sounds detected by the detecting means 60 with reference to the operation conditions stored by the storing means 90 in the step S904. The radio signal is then produced by the modulating means 30 in response to the operation condition of the transmitting means 50 adjusted by the adjusting means in the step S905.

Figure 10:
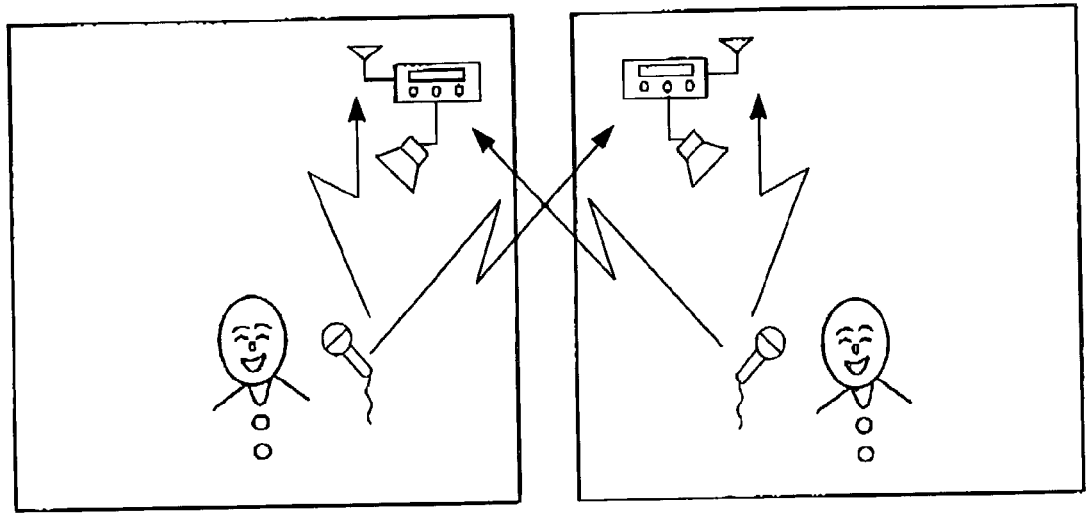
FIG. 10 is a schematic view showing the first embodiment of the wireless communication system according to the present invention.
Figure 11:
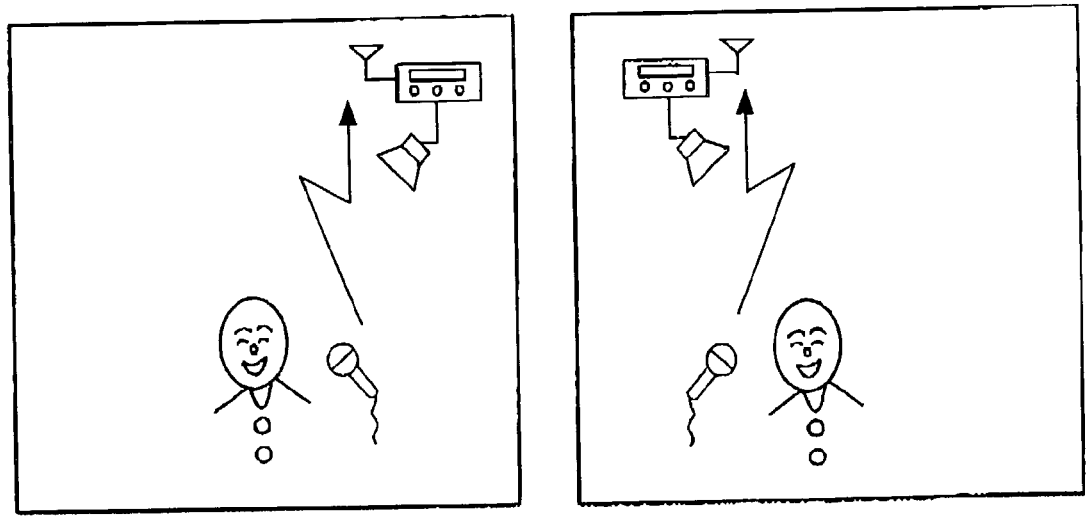
FIG. 11 is a schematic view showing of the conventional wireless communication system.

If the wireless communication systems are installed in the vicinity of each other, as shown in FIG. 10, the radio signal transmitted by the wireless microphone of one of the wireless communication systems can be received by the wireless receiving unit without interfering with the radio signal transmitted by the wireless microphone of the other of the wireless communication systems.

From the above detailed description, it will be understood that the first embodiment of the wireless communication system according to the present invention can adjust the operation conditions of the modulating means 30 without opening and closing the cover member before the switch elements are selectively operated to change the signal channels by reason that the sound signal receiving means 10 is operative to receive the DTMF sounds together with sounds generated in the vicinity of the wireless microphone 101, the detecting means 60 being operative to detect the control signals from among the DTMF sounds and the sounds received by the sound signal receiving means 10, and the adjusting means 70 being operative to adjust the operation condition of the transmitting means 50 in response to the control signals detected by the detecting means 60. This leads to the fact that the first embodiment of the wireless communication system according to the present invention can attain an excellent reproducibility without interfering with each other in the local communication area in which the wireless communication systems are installed in the vicinity to each other.

While there has been described in the foregoing embodiment about the fact that the acoustic operation unit 300 is operative to output the DTMF signals in association with the operation conditions of the wireless microphone 101, the acoustic operation unit 300 may be replaced by cellular mobile telephone for outputting the DTMF sounds in association with the operation conditions of the wireless microphone 101. When the key "1" of the cellular mobile telephone, for example, is pushed by the operator, the DTMF sounds in association with of the pushed key "1" is outputted by the cellular mobile telephone. The DTMF sounds outputted by the cellular mobile telephone is then received by the sound signal receiving means 10. The operation conditions of the wireless microphone 101 is then adjusted by the adjusting means 70 in response to the DTMF sounds received from the cellular mobile telephone.

In the above first embodiment, the DTMF sounds is outputted by the acoustic operation unit 300, however, musical sounds respectively indicative of the operation conditions of the wireless microphone 101 may be outputted by the acoustic operation unit 300.

Although there has been described in the above about the first embodiment of the wireless communication system according to the present invention, this embodiment may be replaced by the wireless communication system according to the second to eighth embodiments of the present invention in order to attain the objects of the present invention. The second to eighth embodiments of the wireless communication system will then be described hereinafter.

Referring then to FIGS. 2 to 8 of the drawings, there are shown block diagrams of the second to eighth preferred embodiments of the wireless communication system according to the present invention. The constitutional elements and the steps of the second to eighth embodiments of the wireless communication system according to the present invention as shown in FIGS. 2 to 8 are entirely the same as those of the first embodiment of the wireless communication system according to the present invention as shown in FIG. 1 except for the constitutional elements and the steps appearing in the following description. Therefore, only the constitutional elements and the steps of the second to eighth embodiments of the wireless communication system different from those of the first embodiment of the wireless communication system will be described in detail hereinafter. The constitutional elements and the steps of the second to eighth embodiments of the wireless communication system entirely the same as those of the first embodiment of the wireless communication system will not be described but bear the same reference numerals and legends as those of the first embodiment of the wireless communication system in FIG. 1 to avoid tedious repetition.

The following description will be directed to the constitutional elements and the steps of the second embodiment of the wireless communication system different from those of the wireless communication system of the first embodiment.

Figure 2:
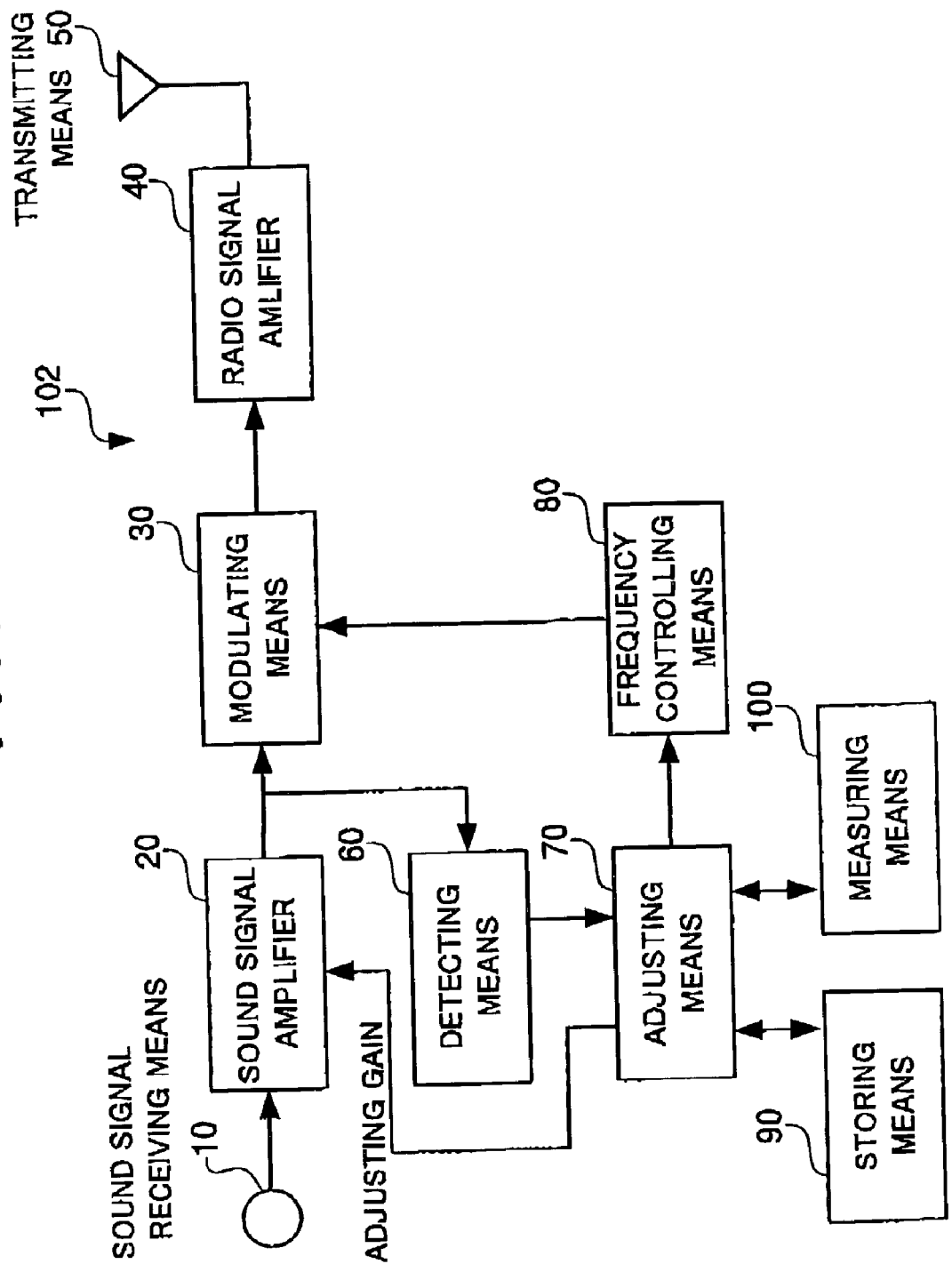
FIG. 2 is a block diagram of the wireless microphone forming part of the wireless communication system according to the second embodiment of the present invention.

The wireless microphone 102 forming part of the wireless communication system according the second embodiment of the present invention is shown in FIG. 2 as comprising the sound signal receiving means 10, the modulating means 30, the radio signal amplifier 40, the transmitting means 50, the detecting means 60, the adjusting means 70, the frequency controlling means 80, the storing means 90, and the measuring means 100, all of which am the same in construction as the wireless microphone 101 shown in FIG. 1 and thus its construction will not be described hereinafter.

The wireless microphone 102 further includes a sound signal amplifier 20 for amplifying the sound signal received by the sound signal receiving means 10 to produce an amplified sound signal, the sound signal amplifier 20 being operative under a plurality of operation conditions and having a plurality of amplification gains in association with the operation conditions to affect the sound signal; and in which the detecting means 60 is operative to detect the control signals respectively indicative of the operation conditions of the sound signal amplifier 20, and the adjusting means 70 is operative to adjust the operation conditions of the sound signal amplifier 20 in response to the control signals detected by the detecting means 60.

In the attached drawings is no flow chart showing the process of the second embodiment of the wireless communication system, but the process of the second embodiment differing from that of the wireless communication system according to the first embodiment will simply be described hereinafter.

The operation condition of the sound signal amplifier 20 is adjusted by the adjusting means 70 in response to the control signals detected by the detecting means 60 with reference to the operation conditions stored by the storing means 90 while the control signals in association with the operation conditions of the sound signal amplifier 20 is outputted by the acoustic operation unit 300 in the step S904. The sound signal is then amplified by the sound signal amplifier 20 in response to the operation conditions of the sound signal amplifier 20 adjusted by the adjusting means 80 in the step S905.

From the above detailed description, it will be understood that the second embodiment of the wireless communication system according to the present invention can adjust the operation conditions of the sound signal amplifier 20 without opening and closing the cover member before the switch elements are selectively operated to change the gains of the sound signal amplifier 20 by reason that the sound signal receiving means 10 is operative to receive the DTMF sounds together with sounds generated in the vicinity of the wireless microphone 102, the detecting means 60 being operative to detect the control signals from among the DTMF sounds and the sounds received by the sound signal receiving means 10, and the adjusting means 70 being operative to adjust the operation condition of the sound signal amplifier 20 in response to the control signals detected by the detecting means 60. This leads to the fact that the second embodiment of the wireless communication system according to the present invention can attain an excellent reproductivity without interfering with each other in the local communication area in which the wireless communication systems are installed in the vicinity to each other.

The following description will be directed to the constitutional elements and the steps of the third embodiment of the wireless communication system different from those of the wireless communication system of the first and second embodiments.

Figure 3:
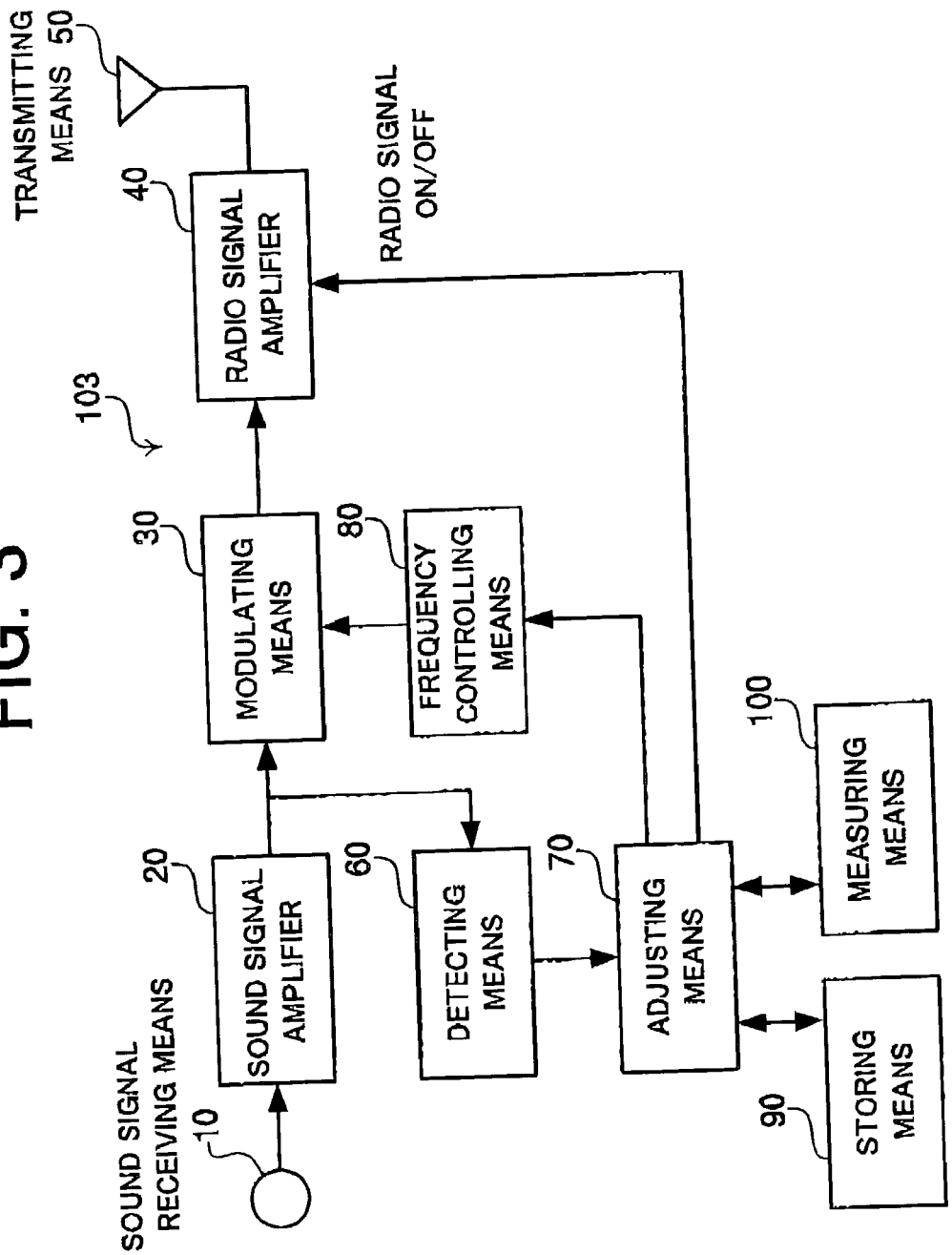
FIG. 3 is a block diagram of the wireless microphone forming part of the wireless communication system according to the third embodiment of the present invention.

The wireless microphone 103 forming part of wireless communication system according the third embodiment of the present invention is shown in FIG. 3 as comprising the sound signal receiving means 10, the sound signal amplifier 20, the modulating means 30, the radio signal amplifier 40, the detecting means 60, the adjusting means 70, the frequency controlling means 80, the storing means 90, and the measuring means 100 all of which are the same in construction as the wireless microphone 101 shown in FIG. 1 and thus its construction will not be described hereinafter.

The wireless microphone 103 further includes transmitting means 50 for transmitting the amplified radio signal, the transmitting means 50 being operative under a plurality of operation conditions and having two different states consisting of first and second states in association with the operation conditions, the first state in which the transmitting means 50 is operative to transmit the amplified radio signal, and the second state in which the transmitting means 50 is operative not to transmit the amplified radio signal; and in which the detecting means 60 is operative to detect the control signals respectively indicative of the operation conditions of the transmitting means 50, and the adjusting means 70 is operative to adjust the operation conditions of the transmitting means 50 in response to the control signals detected by the detecting means 60.

In the attached drawings is no flow chart showing the process of the third embodiment of the wireless communication system, but the process of the third embodiment differing from that of the wireless communication system according to the first embodiment will simply be described hereinafter.

The operation condition of the transmitting means 50 is adjusted by the adjusting means 70 in response to the control signals detected by the detecting means 60 with reference to the operation conditions stored by the storing means 90 while the control signals in association with the operation conditions of the transmitting means 50 is outputted by the acoustic operation unit 300 in the step S904. The radio signal is then transmitted by the transmitting means 50 in response to the operation condition of the transmitting means 50 adjusted by the adjusting means 80 in the step S905.

From the above detailed description, it will be understood that the third embodiment of the wireless microphone 103 according to the present invention can adjust the operation conditions of the transmitting means 50 without opening and closing the cover member before the switch elements are selectively operated to change the operation conditions of the transmitting means 50 by reason that the sound signal receiving means 10 is operative to receive the DTMF sounds together with sounds generated in the vicinity of the wireless microphone 103, the detecting means 60 being operative to detect the control signals from among the DTMF sounds and the sounds received by the sound signal receiving means 10, and the adjusting means 70 being operative to adjust the operation condition of the transmitting means 50 in response to the control signals detected by the detecting means 60. This leads to the fact that the third embodiment of the wireless microphone 103 according to the present invention can attain an excellent reproductivity in the local communication area in which the wireless receiving unit is capable of receiving the radio signal transmitted by the wireless communication system without interfering with the radio signal transmitted by the wireless microphone forming part of the other wireless communication system.

The following description will be directed to the constitutional elements and the steps of the fourth embodiment of the wireless communication system different from those of the wireless communication system of the first to third embodiments.

Figure 4:
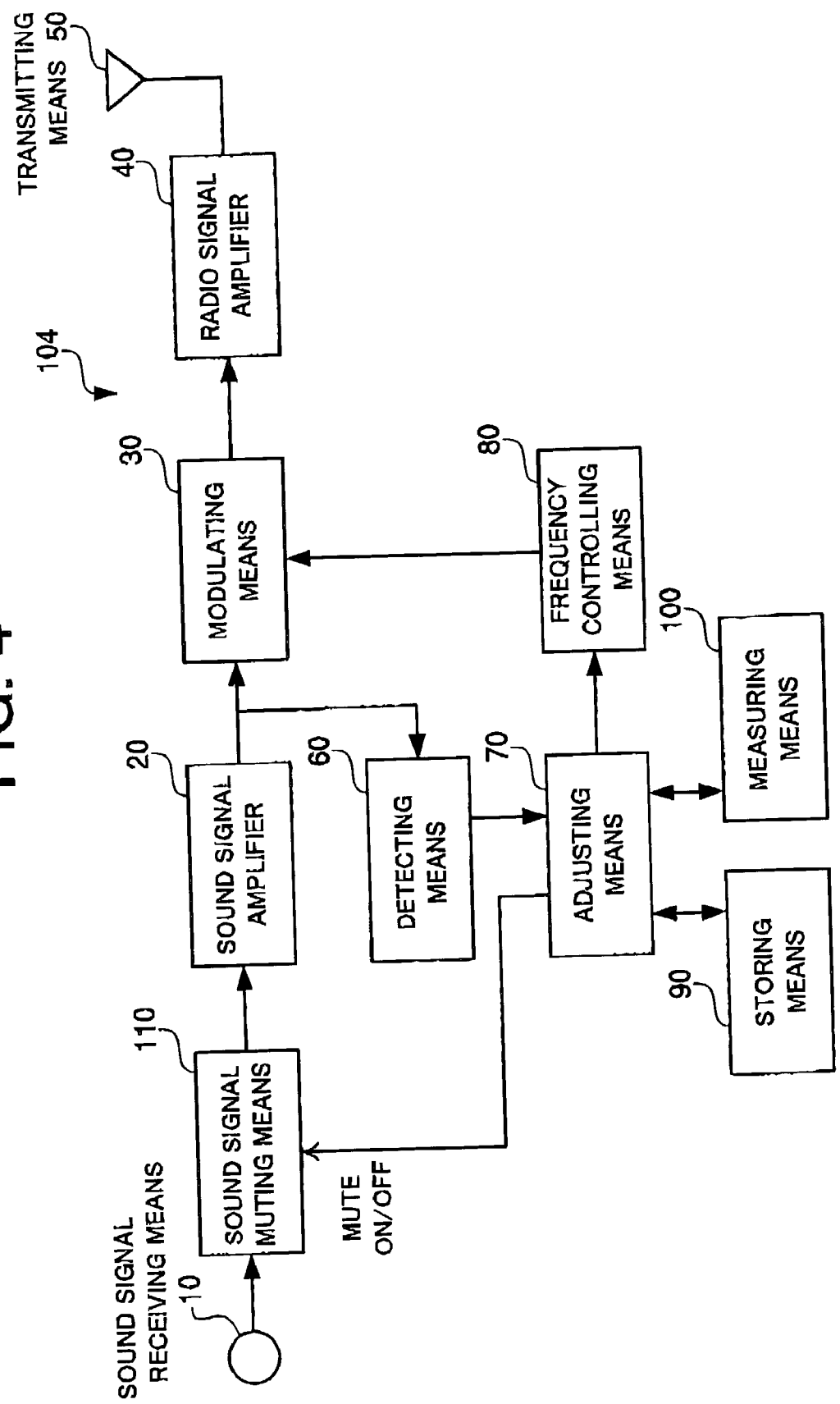
FIG. 4 is a block diagram of the wireless microphone forming part of the wireless communication system according to the fourth embodiment of the present invention.

The wireless microphone 104 forming pan of the wireless communication system according the fourth embodiment of the present invention is shown in FIG. 4 as comprising the sound signal receiving means 10, the sound signal amplifier 20, the modulating means 30, the radio signal amplifier 40, the transmitting means 50, the detecting means 60, the adjusting means 70, the frequency controlling means 80, the storing means 90, and the measuring means 100, all of which are the same in construction as the first embodiment of the wireless microphone 101 shown in FIG. 1 and thus its construction will not be described hereinafter.

The wireless microphone 104 further includes sound signal muting means 110 for muting the sound signal, the sound signal muting means 10 being operative under a plurality of operation conditions and having two different states consisting of first and second states in association with the operation conditions, the first state in which the sound signal muting means 110 is operative not to mute the sound signal received by the sound signal receiving means, and the second state in which the sound signal muting means 110 is operative to mute the sound signals received by the sound signal receiving means; the detecting means 60 is operative to detect the control signals respectively indicative of the operation conditions of the sound signal muting means 110; and the adjusting means 70 is operative to adjust the operation conditions of the sound signal muting means 110 in response to the control signals detected by the detecting means 60.

In the attached drawings is no flow chart showing the process of the fourth embodiment of the wireless communication system, but the process of the fourth embodiment differing from that of the wireless communication system according to the first embodiment will simply be described hereinafter.

The operation condition of the sound signal muting means 110 is adjusted by the adjusting means 70 in response to the control signals detected by the detecting means 60 with reference to the operation conditions stored by the storing means 90 while the control signals in association with the operation conditions of the sound signal muting means 110 is outputted by the acoustic operation unit 300 in the step S904. The sound signal is then muted by the sound signal muting means 110 in response to the operation conditions adjusted by the adjusting means 80 in the step S905.

From the above detailed description, it will be understood that the fourth embodiment of the wireless microphone 104 according to the present invention can adjust the operation conditions of the sound signal muting means 110 without opening and closing the cover member before the switch elements are selectively operated to change the operation conditions of the sound signal muting means 110 by reason that the sound signal receiving means 10 is operative to receive the DTMF sounds together with sounds generated in the vicinity of the wireless microphone 101, the detecting means 60 being operative to detect the control signals from among the DTMF sounds and the sounds received by the sound signal receiving means 10, and the adjusting means 70 being operative to adjust the operation condition of the sound signal muting means 110 in response to the control signals detected by the detecting means 60. This leads to the fact that the fourth embodiment of the wireless microphone 104 according to the present invention can attain an excellent reproductivity without interfering with each other in the local communication area in which the wireless communication systems are installed in the vicinity to each other.

The following description will be directed to the constitutional elements and the steps of the fifth embodiment of the wireless communication, system different from those of the wireless communication system of the first to fourth embodiments.

Figure 5:
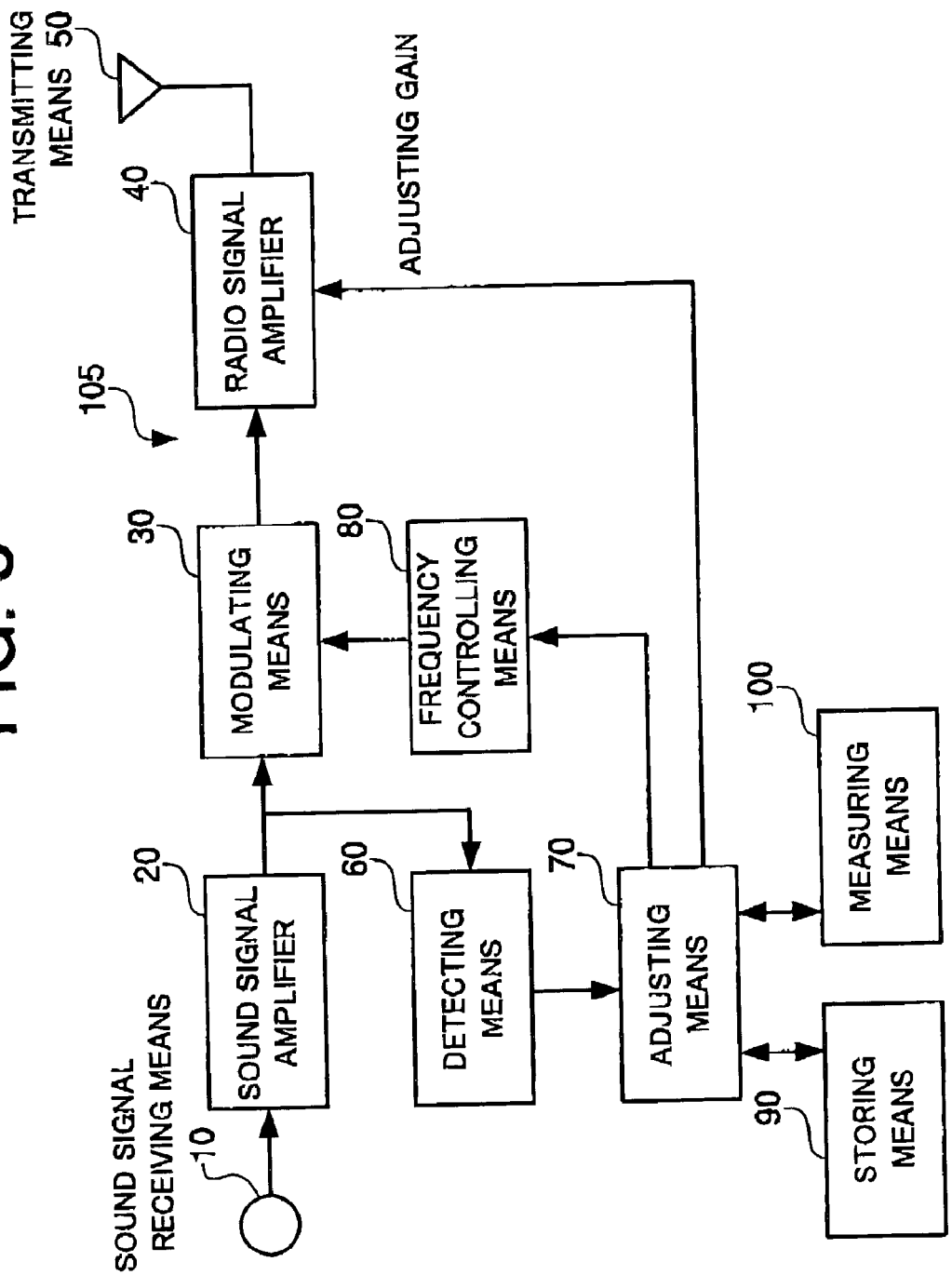
FIG. 5 is a block diagram of the wireless microphone forming part of the wireless communication system according to the fifth embodiment of the present invention.

The wireless microphone 105 forming part of wireless communication system according the fifth embodiment of the present invention is shown in FIG. 5 as comprising the sound signal receiving means 10, the sound signal amplifier 20, the modulating means 30, the transmitting means 50, the detecting means 60, the frequency controlling means 80, the storing means 90, and the measuring means 100, all of which are the same in construction as the first embodiment of the wireless microphone 101 shown in FIG. 1 and thus its construction will not be described hereinafter.

The wireless microphone 105 further includes a radio signal amplifier 40 for amplifying the modulated radio signal to produce an amplified radio signal, the radio signal amplifier 40 being operative under a plurality of operation conditions and having a plurality of gains in association with the operation conditions to affect the modulated radio signal; and in which the detecting means 60 is operative to detect the control signals respectively indicative of the operation conditions of the radio signal amplifier 40, and the adjusting means 60 is operative to adjust the operation conditions of the radio signal amplifier 40 in response to the control signals detected by the detecting means 60.

In the attached drawings is no flow chart showing the process of the fifth embodiment of the wireless communication system, but the process of the fifth embodiment differing from that of the wireless communication system according to the first embodiment will simply be described hereinafter.

The operation condition of the radio signal amplifier 40 is adjusted by the adjusting means 70 in response to the control signals detected by the detecting means 60 with reference to the operation conditions stored by the storing means 90 while the control signals in association with the operation conditions of the radio signal amplifier 40 is outputted by the acoustic operation unit 300 in the step S904. The radio signal is then amplified by the radio signal amplifier 40 in response to the operation condition of the radio signal amplifier 40 adjusted by the adjusting means 80 in the step S905.

From the above detailed description, it will be understood that the fifth embodiment of the wireless microphone 105 according to the present invention can adjust the operation conditions of the radio signal amplifier 40 without opening and closing the cover member before the switch elements are selectively operated to change the gains of the radio signal amplifier 40 by reason that the sound signal receiving means 10 is operative to receive the DTMF sounds together with sounds generated in the vicinity of the wireless microphone 105, the detecting means 60 being operative to detect the control signals from among the DTMF sounds and the sounds received by the sound signal receiving means 10, and the adjusting means 70 being operative to adjust the operation condition of the sound signal amplifier 50 in response to the control signals detected by the detecting means 60. This leads to the fact that the fifth embodiment of the wireless microphone 105 according to the present invention can attain an excellent reproductivity without interfering with each other in the local communication area in which the wireless communication systems are installed in the vicinity to each other.

The following description will be directed to the constitutional elements and the steps of the sixth embodiment of the wireless communication system different from those of the wireless communication system of the first to fifth embodiments.

Figure 6:
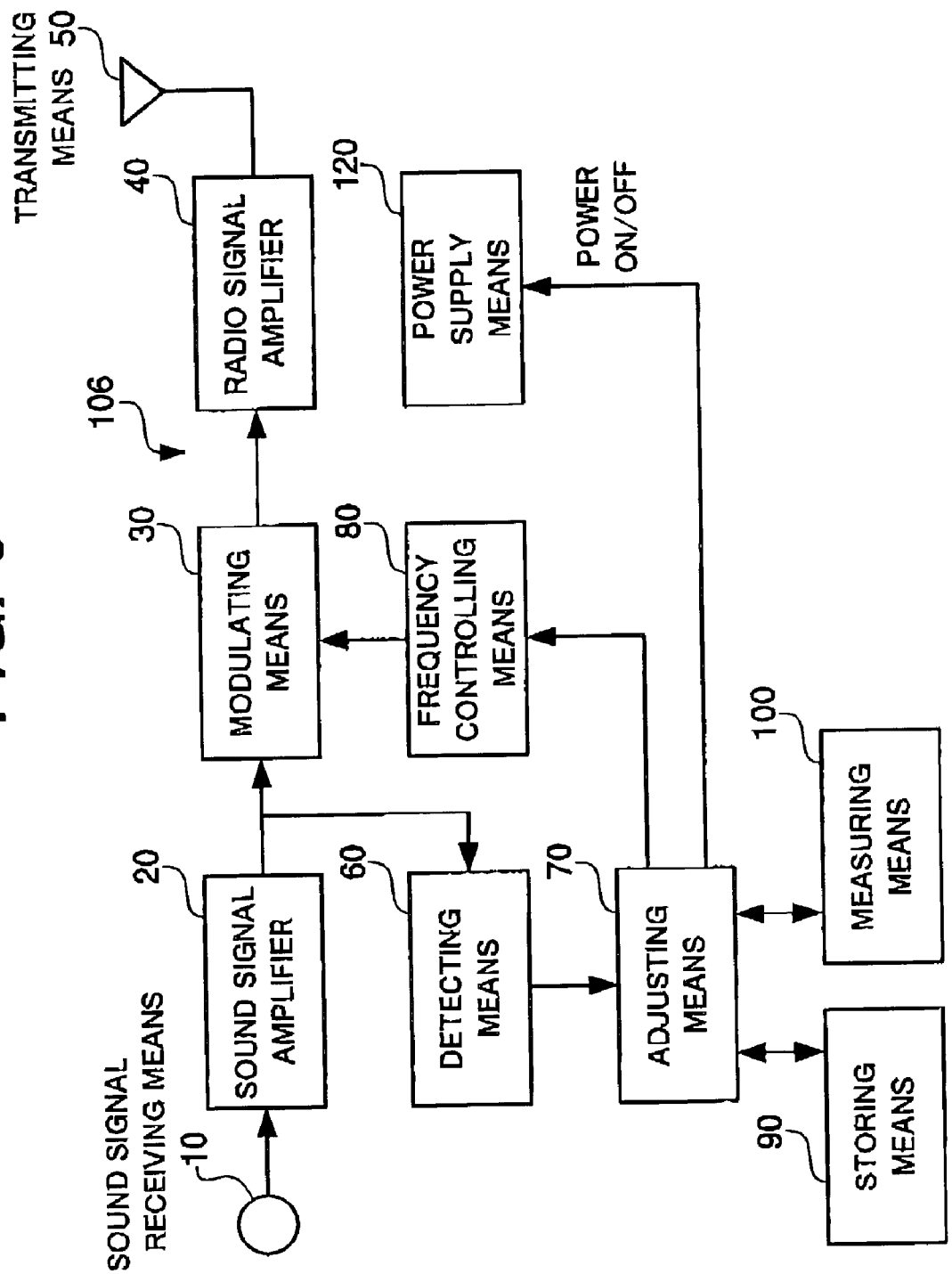
FIG. 6 is a block diagram of the wireless microphone forming part of the wireless communication system according to the sixth embodiment of the present invention.

The wireless microphone 106 forming part of the wireless communication system according the sixth embodiment of the present invention is shown in FIG. 6 as comprising the sound signal receiving means 10, the sound signal amplifier 20, the modulating means 30, the radio signal amplifier 40, the transmitting means 50, the detecting means 60, the adjusting means 70, the frequency controlling means 80, the storing means 90, and the measuring means 100, all of which are the same in construction as the first embodiment of the wireless microphone 101 shown in FIG. 1 and thus its construction will not be described hereinafter. The sixth embodiment of the wireless microphone 106 shown in FIG. 6 further comprises power supply means 120 for supplying electricity in response to the operation conditions adjusted by the adjusting means 70.

The wireless microphone further includes power supply means 120 for supplying electricity, the power supply means 120 being operative under a plurality of operation conditions and having two different states consisting of first and second states in association with the operation conditions, the first state in which the power supply means 120 is operative to supply the electricity, and the second state in which the power supply means 120 is operative to save the electricity; the detecting means 60 is operative to detect the control signals respectively indicative of the operation conditions of the power supply means 110; and the adjusting means 70 is operative to adjust the operation conditions of the power supply means 120 in response to the control signals detected by the detecting means 60.

In the attached drawings is no flow chart showing the process of the sixth embodiment of the wireless communication system, but the process of the sixth embodiment differing from that of the wireless communication system according to the first embodiment will simply be described hereinafter.

The operation condition of the power supply means 120 is adjusted by the adjusting means 70 in response to the control signals detected by the detecting means 60 with reference to the operation conditions stored by the storing means 90 while the control signals in association with the operation conditions of the power supply means 120 is outputted by the acoustic operation unit 300 in the step S904. The sound signal is then amplified by the sound signal amplifier 20 in response to the operation condition of the power supply means 120 adjusted by the adjusting means 80 in the step S905.

From the above detailed description, it will be understood that the sixth embodiment of the wireless microphone 106 according to the present invention can adjust the operation conditions of the power supply means 120 without opening and closing the cover member before the switch elements are selectively operated to change the operation conditions of the power supply means 120 by reason that the sound signal receiving means 10 is operative to receive the DTMF sounds together with sounds generated in the vicinity of the wireless microphone 106, the detecting means 60 being operative to detect the control signals from among the DTMF sounds and the sounds received by the sound signal receiving means 10, and the adjusting means 70 being operative to adjust the operation condition of the power supply means 120 in response to the control signals detected by the detecting means 60. This leads to the fact that the sixth embodiment of the wireless microphone 106 according to the present invention can attain an excellent reproductivity without interfering with each other in the local communication area in which the wireless communication systems are installed in the vicinity to each other.

The following description will be directed to the constitutional elements and the steps of the seventh embodiment of the wireless communication system different from those of the wireless communication system of the first to sixth embodiments.

Figure 7:
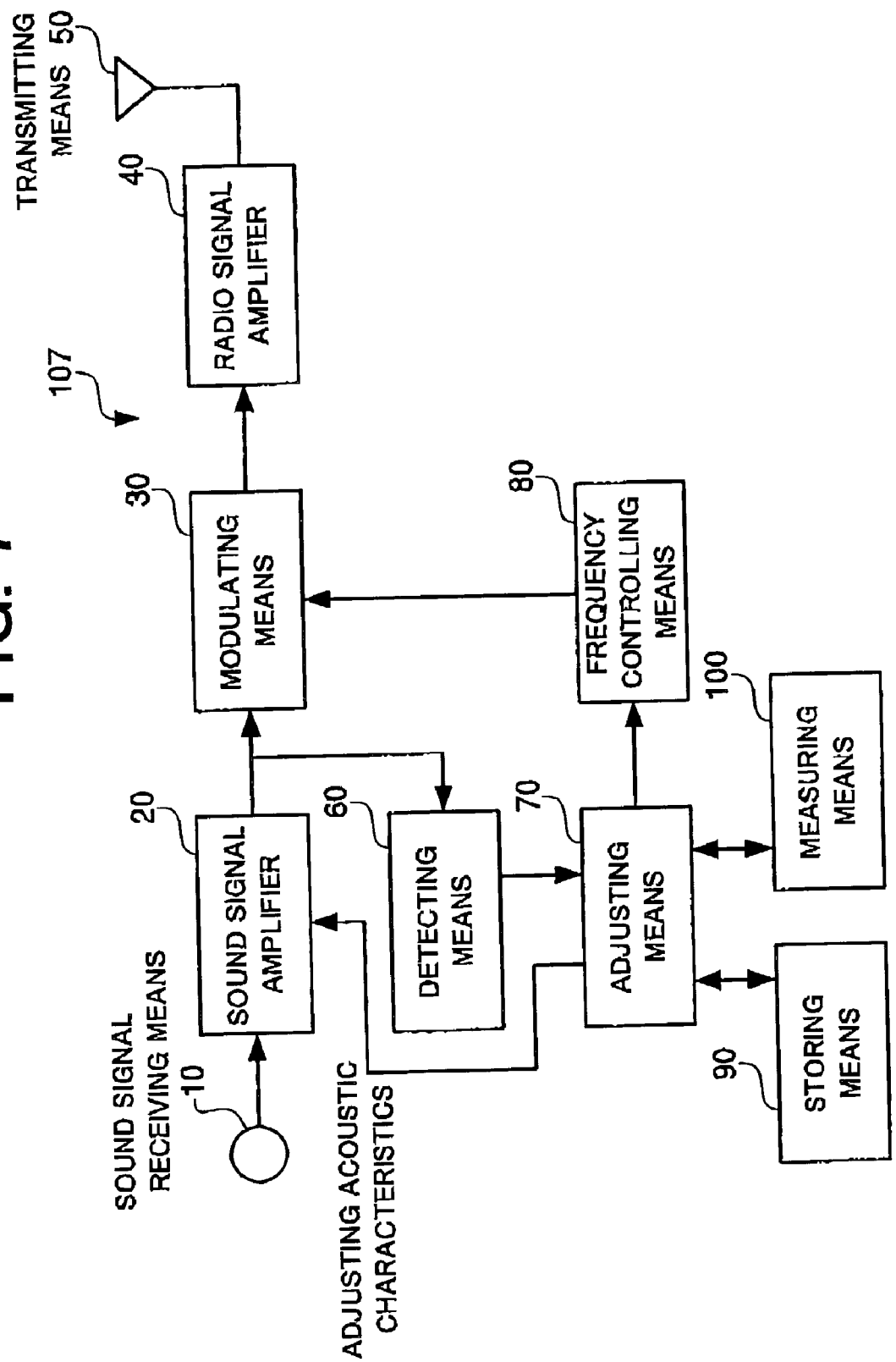
FIG. 7 is a block diagram of the wireless microphone forming part of the wireless communication system according to the seventh embodiment of the present invention.

The wireless microphone 107 forming part of the wireless communication system according the seventh embodiment of the present invention is shown in FIG. 7 as comprising the sound signal receiving means 10, the modulating means 30, the radio signal amplifier 40, the transmitting means 50, the detecting means 60, the adjusting means 70, the frequency controlling means 80, the storing means 90, and the measuring means 100, all of which are the same in construction as the first embodiment of the wireless microphone 101 shown in FIG. 1 and thus its construction will not be described hereinafter.

The wireless microphone 107 further includes sound signal amplifier 20 for amplifying the sound signal received by the sound signal receiving means 10 to produce an amplified sound signal, the sound signal amplifier 20 being operative under a plurality of operation conditions and having a plurality of acoustic characteristics in association with the operation conditions to affect the sound signal based on the acoustic characteristics; and in which the detecting means 60 is operative to detect the control signals respectively indicative of the operation conditions of the sound signal amplifier 20, and the adjusting means 70 is operative to adjust the operation conditions of the sound signal amplifier 20 in response to the control signals detected by the detecting means 60. The acoustic characteristics of the sound signal amplifier 20 includes, for example, at least one of speech characteristics, vocal characteristics, high pass filter characteristics, and low pass filter characteristics.

In the attached drawings is no flow chart showing the process of the seventh embodiment of the wireless communication system, but the process of the seventh embodiment differing from that of wireless communication system according to the first embodiment will simply be described hereinafter.

The operation condition of the sound signal amplifier 20 is adjusted by the adjusting means 70 in response to the control signals detected by the detecting means 60 with reference to the operation conditions stored by the storing means 90 while the control signals in association with the operation conditions of the sound signal amplifier 20 is outputted by the acoustic operation unit 300 in the step S904. The sound signal is then amplified by the sound signal amplifier 20 in response to the operation condition of the sound signal amplifier 20 adjusted by the adjusting means 70 in the step S905.

From the above detailed description, it will be understood that the seventh embodiment of the wireless communication system according to the present invention can adjust the operation conditions of the sound signal amplifier 20 without opening and closing the cover member before the switch elements are selectively operated to change the acoustic characteristics of the sound signal amplifier 20 by reason that the sound signal receiving means 10 is operative to receive the DTMF sounds together with sounds generated in the vicinity of the wireless microphone 101, the detecting means 60 being operative to detect the control signals from among the DTMF sounds and the sounds received by the sound signal receiving means 10, and the adjusting means 70 being operative to adjust the operation condition of the sound signal amplifier 20 in response to the control signals detected by the detecting means 60. This leads to the fact that the seventh embodiment of the wireless microphone 107 according to the present invention can attain an excellent reproductivity without interfering with each other in the local communication area in which the wireless communication systems are installed in the vicinity to each other.

The following description will be directed to the constitutional elements and the steps of the eighth embodiment of the wireless communication system different from those of the wireless communication system of the first to seventh embodiments.

Figure 8:
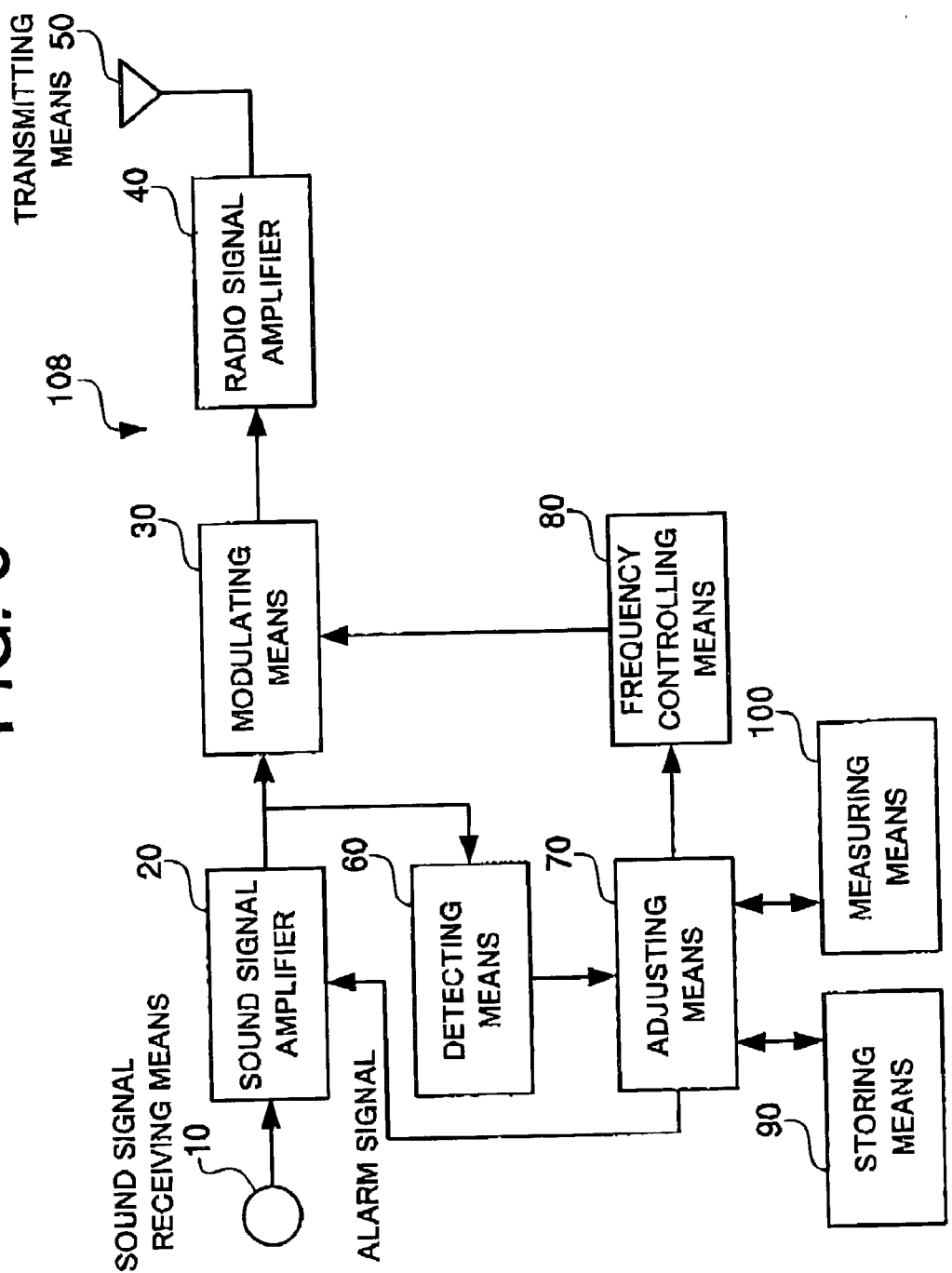
FIG. 8 is a block diagram of the wireless microphone forming part of the wireless communication system according to the eighth embodiment of the present invention.

The wireless microphone 108 forming part of the wireless communication system according the eighth embodiment of the present invention is shown in FIG. 8 as comprising the sound signal receiving means 10, the sound signal amplifier 20, the modulating means 30, the radio signal amplifier 40, the transmitting means 50, the detecting means 60, the adjusting means 70, the frequency controlling means 80, the storing means 90, and the measuring means 100, all of which are the same in construction as the first embodiment of the wireless microphone 101 shown in FIG. 1 and thus its construction will not be described hereinafter.

The wireless microphone 108 further includes measuring means 100 for measuring an elapsed time, for judging whether or not the elapsed time exceeds a predetermined waiting time, for producing an alarm signal, and the measuring means 100 being operative to produce the alarm signal when judging as the elapsed time exceeds the predetermined waiting time; sound signal amplifier 20 for amplifying the alarm signal produced by the measuring means 100 to produce an amplified alarm signal, the sound signal amplifier 20 being operative under a plurality of operation conditions and having two different states consisting of first and second states in association with the operation conditions, the first state in which the sound signal amplifier 20 is operative to amplify the alarm signal to produce the amplified alarm signal, and the second state in which the sound signal amplifier 20 is operative not to amplify the alarm signal; and in which the detecting means 60 is operative to detect the control signals respectively indicative of the operation conditions of the sound signal amplifier 20, and the adjusting means is operative to adjust the operation conditions of the sound signal amplifier 20 in response to the control signals detected by the detecting means 60.

In the attached drawings is no flow chart showing the process of the eighth embodiment of the wireless communication system, but the process of the eighth embodiment differing from that of the wireless communication system according to the first embodiment will simply be described hereinafter.

The operation condition of the measuring means 100 is adjusted by the adjusting means 70 in response to the control signals detected by the detecting means 60 with reference to the operation conditions stored by the storing means 90 while the control signals in association with the operation conditions of the measuring means 100 is outputted by the acoustic operation unit 300 in the step S904. The alarm signal is then amplified by the sound signal amplifier 20 in response to the operation condition of the measuring means 100 adjusted by the adjusting means 70 in the step S905.

From the above detailed description, it will be understood that the eighth embodiment of the wireless communication system according to the present invention can adjust the operation conditions of the wireless microphone 108 without opening and closing the cover member before the switch elements are selectively operated to change the operation conditions of the measuring means 100 by reason that the sound signal receiving means 10 is operative to receive the DTMF sounds together with sounds generated in the vicinity of the wireless microphone 101, the detecting means 60 being operative to detect the control signals from among the DTMF sounds and the sounds received by the sound signal receiving means 10, and the adjusting means 70 being operative to adjust the operation conditions of the measuring means 100 in response to the control signals detected by the detecting means 60. This leads to the fact that the eighth embodiment of the wireless microphone 108 according to the present invention can attain an excellent reproductivity without interfering with each other in the local communication area in which the wireless communication systems are installed in the vicinity to each other.

Although there have been described in the foregoing embodiments about the facts that the detecting means 60 forming part of the wireless microphone 101, 102, 103, 104, 105, 106, 107, and 108 is operative to detect the control signals selectively from among the sound signals and the control signals, the acoustic operation unit 300 may further have at least one of operators identity information (referred to simply as "operators ID") and groups identity information (referred to simply as "groups ID") to output the sound signal and the control signals indicative of at least one of the operators ID and the groups ID while the detecting means 60 may be operative to detect the operators ID and the groups ID from among the sound signal and the control signals outputted by the acoustic operation unit 300. In the concrete, the storing means 90 is operative to store a plurality of operators ID and groups ID, the detecting means 60 being operative to detect the operators ID and the groups ID from among the sound signals and the control signals outputted by the acoustic operation unit 300, the adjusting means 70 being operative to judge whether or not the operator ID and the group ID detected by the detecting means 60 accords with any one of the operators ID and the groups ID stored by the storing means 90 before adjusting the operation conditions in response to the control signals detected by the detecting means 60. The adjusting means 70 is, therefore, operative to adjust the operation conditions in response to the control signals detected by the detecting means 60 when the adjusting means 70 is operative to judge as the operators ID and the groups ID detected by the detecting means 60 accords with any one of the operators ID and the groups ID stored by the storing means 90. The adjusting means 70, on the other hand, is operative not to adjust the operation conditions in response to the control signals detected by the detecting means 60 when the adjusting means 70 is operative to judge as the operators ID and the groups ID detected by the detecting means 60 does not accord with any one of the operators ID and the groups ID stored by the storing means 90.

In the above embodiments, the sound signals, the control signals, and the DTMF sounds outputted by the acoustic operation unit 300 are respectively audible sounds, however, the frequencies of the sound signals and the control signals to be outputted by the acoustic operation unit 300 may be equal to or smaller than approximately 20 Hz, or infrasound. On the other hand, the frequencies of the sound signals and the control signals to be outputted by the acoustic operation unit 300 may be larger than approximately 20 kHz, or ultrasonic sound.

As will be seen from the foregoing description, the wireless communication system, the wireless microphone, and the wireless microphone control method can make it easy to adjust the channel, the gain, and other operation conditions. This leads to the fact that the wireless communication system, the wireless microphone, and the wireless microphone control method, therefore, can attain an excellent reproductivity without interfering with each other in the local communication area in which the wireless communication systems are installed in the vicinity to each other.

It will be apparent to those skilled in the art and it is contemplated that variations and, or changes in the embodiments illustrated and described herein may be without departure from the present invention. Accordingly, it is intended that the foregoing description is illustrative only, not limiting, and that the true spirit and scope of the present invention will be determined by the appended claims.

What is claimed is:

1. A wireless microphone for receiving a sound signal and transmitting a radio signal and operable in combination with an acoustic operation unit to output a control signal, comprising:

modulating means for modulating said radio signal with said sound signal to produce a modulated radio signal, said modulating means being operative under a plurality of operation conditions and having a plurality of signal channels in association with said operation conditions allowing said modulated radio signals to pass therethrough;

detecting means for detecting said control signal outputted by said acoustic operation unit, said control signal being indicative of said operation conditions of said modulating means;

adjusting means for adjusting said operation conditions of said modulating means in response to said control signal from said acoustic operations unit, and measuring means for measuring elapse time and judging whether or not the elapse time exceeds a predetermined waiting time, and in which said adjusting means is not operative to adjust the operation conditions in response to the control signals when the measuring means judges that the elapse time exceeds said predetermined waiting time.

2. A wireless microphone, as set forth in claim 1, in which said acoustic operation unit is operative to output a sound signal indicative of a sound wave together with said control signal; and which further comprises: sound signal receiving means for receiving a sound signal indicative of a sound wave together with said control signal outputted by said accoustic operation unit and said sound signal; and in which said detecting means is operative to detect said control signal selectively from among said control signal and said sound signal received by said sound signal receiving means.

3. A wireless microphone for receiving a sound signal and transmitting a radio signal and operable in combination with an acoustic operation unit to output a plurality of control signals and a sound signal indicative of a sound wave, comprising:

sound signal receiving means for receiving a sound signal indicative of a sound wave together with said control signals outputted by said accoustic operation unit and said sound signal;

modulating means for modulating said radio signal with said sound signal to produce a modulated radio signal, said modulating means being operative under a plurality of operation conditions and having a plurality of signal channels in association with said operation conditions allowing said modulated radio signals to pass therethrough;

detecting means for detecting said control signals selectively from among said control signals and said sound signals received by said sound signal receiving means, said control signals being respectively indicative of said operation conditions of said modulating means; and adjusting means for adjusting said operation conditions of said modulating means in response to said control signal detected by said detecting means, and measuring means for measuring elapse time and judging whether or not the elapse time exceeds a predetermined waiting time, and in which said adjusting means is not operative to adjust the operation conditions in response to the control signals when the measuring means judges that the elapse time exceeds said predetermined waiting time.

4. A wireless microphone as set forth in claim 3, which further comprises a sound signal amplifier for amplifying said sound signal received by said sound signal receiving means to produce an amplified sound signal, said sound signal amplifier being operative under a plurality of operation conditions and having a plurality of amplification gains in association with said operation conditions to affect said sound signal; and in which said detecting means is operative to detect said control signals respectively indicative of said operation conditions of said sound signal amplifier, and said adjusting means is operative to adjust said operation conditions of said sound signal amplifier in response to said control signals detected by said detecting means.

5. A wireless microphone as set forth in claim 3, which further comprises sound signal muting means for muting said sound signal, said sound signal muting means being operative under a plurality of operation conditions and having two different states consisting of first and second states in association with said operation conditions, said first state in which said sound signal muting means is operative not to mute said sound signal received by said sound signal receiving means, and said second state in which said sound signal muting means is operative to mute said sound signals received by said sound signal receiving means; and in which said detecting means is operative to detect said control signals respectively indicative of said operation conditions of said sound signal muting means, and said adjusting means is operative to adjust said operation conditions of said sound signal muting means in response to said control signals detected by said detecting means.

6. A wireless microphone as set forth in claim 3, which further comprises a radio signal amplifier for amplifying said modulated radio signal to produce an amplified radio signal, said radio signal amplifier being operative under a plurality of operation conditions and having a plurality of gains in association with said operation conditions to affect said modulated radio signal; and in which said detecting means is operative to detect said control signals respectively indicative of said operation conditions of said radio signal amplifier, and said adjusting means is operative to adjust said operation conditions of said radio signal amplifier in response to said control signals detected by said detecting means.

7. A wireless microphone as set forth in claim 6, which further comprises: transmitting means for transmitting said amplified radio signal, said transmitting means being operative under a plurality of operation conditions and having two different states consisting of first and second states in association with said operation conditions, said first state in which said transmitting means is operative to transmit said amplified radio signal, and said second state in which said transmitting means is operative not to transmit said amplified radio signal; and in which said detecting means is operative to detect said control signals respectively indicative of said operation conditions of said transmitting means, and said adjusting means is operative to adjust said operation conditions of said transmitting means in response to said control signals detected by said detecting means.

8. A wireless microphone as set forth in claim 3, which further comprises power supply means for supplying electricity, said power supply means being operative under a plurality of operation conditions and having two different states consisting of first and second states in association with said operation conditions, said first state in which said power supply means is operative to supply said electricity, and said second state in which said power supply means is operative to save said electricity; and in which said detecting means is operative to detect said control signals respectively indicative of said operation conditions of said power supply means; and said adjusting means is operative to adjust said operation conditions of said power supply means in response to said control signals detected by said detecting means.

9. A wireless microphone as set forth in claim 3, which further comprises sound signal amplifier for amplifying said sound signal received by said sound signal receiving means to produce an amplified sound signal, said sound signal amplifier being operative under a plurality of operation conditions and having a plurality of acoustic characteristics in association with said operation conditions to affect said sound signal based on said acoustic characteristics; and in which said detecting means is operative to detect said control signals respectively indicative of said operation conditions of said sound signal amplifier, and said adjusting means is operative to adjust said operation conditions of said sound signal amplifier in response to said control signals detected by said detecting means.

10. A wireless microphone as set forth in claim 3, which further comprises said measuring means for measuring said elapsed time, for judging whether or not said elapsed time exceeds said predetermined waiting time, for producing an alarm signal, and said measuring means being operative to produce said alarm signal when judging as said elapsed time exceeds said predetermined waiting time; sound signal amplifier for amplifying said alarm signal produced by said measuring means to produce an amplified alarm signal, said sound signal amplifier being operative under a plurality of operation conditions and having two different states consisting of first and second states in association with said operation conditions, said first state in which said sound signal amplifier is operative to amplify said alarm signal to produce said amplified alarm signal, and said second state in which said sound signal amplifier is operative not to amplify said alarm signal; and in which said detecting means is operative to detect said control signals respectively indicative of said operation conditions of said sound signal amplifier, and said adjusting means is operative to adjust said operation conditions of said sound signal amplifier in response to said control signals detected by said detecting means.

11. A wireless microphone as set forth in claim 3, which further comprises a storing means for storing a plurality of operators identity information, and in which said detecting means is operative to detect said control signal indicative of said operators identity information; and said adjusting means is operative to adjust said operation conditions in response to said control signals detected by said detecting means after judging whether or not said operators identity information detected by said detecting means accords with one of said operators identity information stored by said storing means.

12. A wireless microphone as set forth in claim 3, which further comprises a storing means for storing a plurality of groups identity information, and in which said detecting means is operative to detect said control signal indicative of said groups identity information, and said adjusting means are operative to adjust said operation conditions in response to said control signals detected by said detecting means after judging whether or not said groups identity information detected by said detecting means accords with one of said groups identity information stored by said storing means.

13. A wireless microphone adjusting method, comprising:
a sound signal receiving step of receiving a sound signal indicative of a sound wave together with a plurality of control signals outputted by an acoustic operation unit;
a modulating step of modulating said radio signal with said sound signal to produce a modulated radio signal under a plurality of operation conditions and a plurality of signal channels in association with said operation conditions allowing said modulated radio signals to pass therethrough;
a detecting step of detecting said control signals selectively from among said control signals and said sound signals received in said sound signal receiving step; and
an adjusting step of adjusting said operation conditions in association with said control signals detected in said detecting step
a measuring step of measuring elapse time and judging whether or not the elapse time exceeds a predetermined waiting time, and in which
said adjusting step is not carried out to adjust the operation conditions in response to the control signals when it is judged in said measuring step that the elapse time exceeds said predetermined waiting time.

14. A wireless communication system for receiving a sound signal and transmitting a radio signal, comprising:
an acoustic operation unit for outputting a plurality of control signals and a sound signal indicative of a sound wave; and a wireless microphone for receiving said control signals from said acoustic operation unit, and
said wireless microphone including: sound signal receiving means for receiving a sound signal indicative of a sound wave together with said control signals outputted by said acoustic operation unit and a sound signal;
modulating means for modulating said radio signal with said sound signal to produce a modulated radio signal, said modulating means being operative under a plurality of operation conditions and having a plurality of signal channels in association with said operation conditions allowing said modulated radio signals to pass therethrough;
detecting means for detecting said control signals selectively from among said control signals and said sound signals received by said sound signal receiving means, said control signals being respectively indicative of said operation conditions of said modulating means;
adjusting means for adjusting said operation conditions of said modulating means in response to said control signal detected by said detecting means, and
measuring means for measuring elapse time and judging whether or not the elapse time exceeds a predetermined waiting time, and in which
said adjusting means is not operative to adjust the operation conditions in response to the control signals when the measuring means judges that the elapse time exceeds said predetermined waiting time.

15. A wireless communication system as set forth in claim 14, in which said wireless microphone includes a sound signal amplifier for amplifying said sound signal received by said sound signal receiving means to produce an amplified sound signal, said sound signal amplifier being operative under a plurality of operation conditions and having a plurality of amplification gains in association with said operation conditions to affect said sound signal; and in which said detecting means is operative to detect said control signals respectively indicative of said operation conditions of said sound signal amplifier, and said adjusting means is operative to adjust said operation conditions of said sound signal amplifier in response to said control signals detected by said detecting means.

16. A wireless communication system as set forth in claim 15, in which said wireless microphone includes transmitting means for transmitting said amplified radio signal, said transmitting means being operative under a plurality of operation conditions and having two different states consisting of first and second states in association with said operation conditions, said first state in which said transmitting means is operative to transmit said amplified radio signal, and said second state in which said transmitting means is operative not to transmit said amplified radio signal; and in which said detecting means is operative to detect said control signals respectively indicative of said operation conditions of said transmitting means, and said adjusting means is operative to adjust said operation conditions of said transmitting means in response to said control signals detected by said detecting means.

17. A wireless communication system as set forth in claim 14, in which said wireless microphone further includes sound signal muting means for muting said sound signal, said sound signal muting means being operative under a plurality of operation conditions and having two different states consisting of first and second states in association with said operation conditions, said first state in which said sound signal muting means is operative not to mute said sound signal received by said sound signal receiving means, and said second state in which said sound signal muting means is operative to mute said sound signals received by said sound signal receiving means; said detecting means is operative to detect said control signals respectively indicative of said operation conditions of said sound signal muting means; and said adjusting means is operative to adjust said operation conditions of said sound signal muting means in response to said control signals detected by said detecting means.

18. A wireless communication system as set forth in claim 14, in which said wireless microphone includes a radio signal amplifier for amplifying said modulated radio signal to produce an amplified radio signal, said radio signal amplifier being operative under a plurality of operation conditions and having a plurality of gains in association with said operation conditions to affect said modulated radio signal; and in which said detecting means is operative to detect said control signals respectively indicative of said operation conditions of said radio signal amplifier, and said adjusting means is operative to adjust said operation conditions of said radio signal amplifier in response to said control signals detected by said detecting means.

19. A wireless communication system as set forth in claim 14, in which said wireless microphone includes power supply means for supplying electricity, said power supply means being operative under a plurality of operation conditions and having two different states consisting of first and second states in association with said operation conditions, said first state in which said power supply means is operative to supply said electricity, and said second state in which said power supply means is operative to save said electricity; said detecting means is operative to detect said control signals respectively indicative of said operation conditions of said power supply means; and said adjusting means is operative to adjust said operation conditions of said power supply means in response to said control signals detected by said detecting means.

20. A wireless communication system as set forth in claim 14, in which said wireless microphone includes sound signal amplifier for amplifying said sound signal received by said sound signal receiving means to produce an amplified sound signal, said sound signal amplifier being operative under a plurality of operation conditions and having a plurality of acoustic characteristics in association with said operation conditions to affect said sound signal based on said acoustic characteristics; and in which said detecting means is operative to detect said control signals respectively indicative of said operation conditions of said sound signal amplifier, and said adjusting means is operative to adjust said operation conditions of said sound signal amplifier in response to said control signals detected by said detecting means.

21. A wireless communication system as set forth in claim 14, in which said wireless microphone includes said measuring means for measuring said elapsed time, for judging whether or not said elapsed time exceeds said predetermined waiting time, for producing an alarm signal, and said measuring means being operative to produce said alarm signal when judging as said elapsed time exceeds said predetermined waiting time; sound signal amplifier for amplifying said alarm signal produced by said measuring means to produce an amplified alarm signal, said sound signal amplifier being operative under a plurality of operation conditions and having two different states consisting of first and second states in association with said operation conditions, said first state in which said sound signal amplifier is operative to amplify said alarm signal to produce said amplified alarm signal, and said second state in which sand sound signal amplifier is operative not to amplify said alarm signal; and in which said detecting means is operative to detect said control signals respectively indicative of said operation conditions of said sound signal amplifier, and said adjusting means is operative to adjust said operation conditions of said sound signal amplifier in response to said control signals detected by said detecting means.

22. A wireless communication system as set forth in claim 14, in which said acoustic operation unit is operative to output dial tone multi-frequency signals respectively indicative of said control signals.

23. A wireless communication system as set forth in claim 14, in which said acoustic operation unit is operative to output musical sounds respectively indicative of said control signals.

* * * * *

UNITED STATES PATENT AND TRADEMARK OFFICE
CERTIFICATE OF CORRECTION

PATENT NO. : 7,054,625 B2 Page 1 of 1
APPLICATION NO. : 10/307173
DATED : May 30, 2006
INVENTOR(S) : Yuji Kawasaki et al.

It is certified that error appears in the above-identified patent and that said Letters Patent is hereby corrected as shown below:

Claim 21, Column 22, Line 40, please delete "sand", and insert therefor --said--.

Signed and Sealed this

Twenty-sixth Day of December, 2006

JON W. DUDAS
*Director of the United States Patent and Trademark Office*